June 7, 1960

J. R. PARKER 2,939,719

BACKBONE-TYPE VEHICLE FRAME

Filed Jan. 7, 1957

INVENTOR.
JOHN R PARKER
BY
Andrus + Sceales
Attorneys

June 7, 1960  J. R. PARKER  2,939,719
BACKBONE-TYPE VEHICLE FRAME
Filed Jan. 7, 1957  2 Sheets-Sheet 2

INVENTOR.
JOHN R. PARKER
BY
Andrus & Scales
Attorneys

United States Patent Office 2,939,719
Patented June 7, 1960

2,939,719

BACKBONE-TYPE VEHICLE FRAME

John R. Parker, Hartland, Wis., assignor to A. O. Smith Corporation, Milwaukee, Wis., a corporation of New York Filed Jan. 7, 1957, Ser. No. 632,856

6 Claims. (Cl. 280—106)

This invention relates to a vehicle frame and more particularly to a backbone-type vehicle frame in which the side rails converge and are connected together at the central portion of the frame.

Recently the trend in the automotive industry is toward a longer and lower automobile. In order to reduce the overall height of the automobile, it is also necessary to lower the floor and particularly the floor in the rear seat area. The use of a backbone-type frame, in which the side rails converge at the center of the frame, provides a lowering in the height of the floor in the rear seat area due to the absence of structural members at the sides of the vehicle in the rear floor area.

The present invention is directed to an improved backbone-type frame construction which increases the rigidity of the frame. According to the invention, the central portion of the side rails of the frame converge at the center frame and are connected together at this location by a top and bottom plate to form a box-shaped tunnel through which the drive shaft extends.

The side rails themselves are formed of channel members which are secured together to provide the side rail with a box-shaped cross section. The inner channel member of each side rail terminates at the tunnel while the outer members of the side rails extend continuously from one end of the frame to the other.

To provide increased rigidity in the area of the tunnel and prevent parallelogramming, a bulkhead is disposed transversely of the frame at the ends of the tunnel and is secured between the webs of the outer members of the side rails.

The bulkhead connecting the top and bottom plates and the outer side rail members in the tunnel area substantially increases the rigidity of the frame. Furthermore, with the present construction the length of the frame and the wheel base of the vehicle can be readily varied with a minimum die cost and this substantially reduces the cost of tooling.

In a modified form of the invention, the bulkhead plates are welded edgewise between the webs of the inner side rail members at the ends of the tunnel. In this embodiment the webs of the inner side rail members are bent laterally toward the outer member at a position inwardly adjacent the attachment to the bulkhead and are secured to the web of the outer side rail member. This construction is similar to the first embodiment, with the bent ends of the inner side rail members and the bulkhead plate constituting, in effect, a single bulkhead extending between the webs of the outer side rail members.

Other objects and advantages will appear in the course of the following description.

The drawings illustrate the best mode presently contemplated of carrying out the invention.

The drawings illustrate a back-bone type vehicle frame comprising a pair of side rails 1 which are connected together by a front suspension cross bar 2, an engine support cross bar 3 and a rear cross bar 4.

Figure 2:
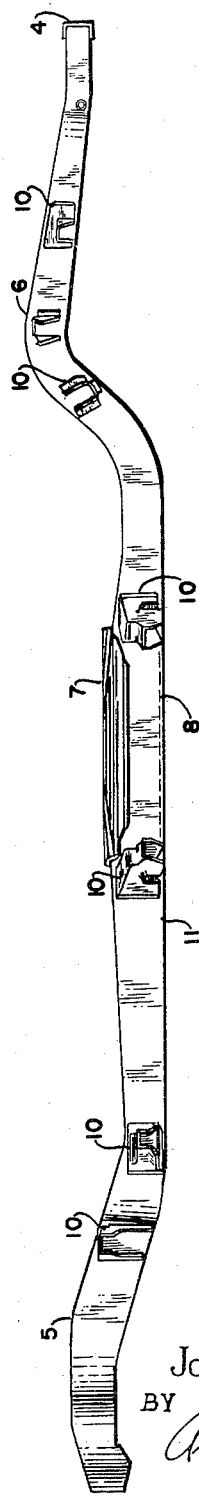
Fig. 2 is a side elevation of the frame shown in Figure 1.

To accommodate the wheel and axle assemblies, each side rail is provided with a pair of kicked-up portions 5 and 6 which are offset in a vertical plane, as best shown in Fig. 2.

According to the invention, the side rails 1 converge toward each other and are connected together at the center of the frame by a top plate 7 and a bottom plate 8 to define a central tunnel 9. A plurality of body brackets 10 extend outwardly from each side rail and are adapted to support the vehicle body.

Each of the side rails 1 is formed of a pair of channel shaped members, an outer member 11 and an inner member 12, which are suitably secured together at intervals throughout their length with the open side of the channel members facing each other to provide the side rail with a generally box-shaped cross section.

Figure 1:
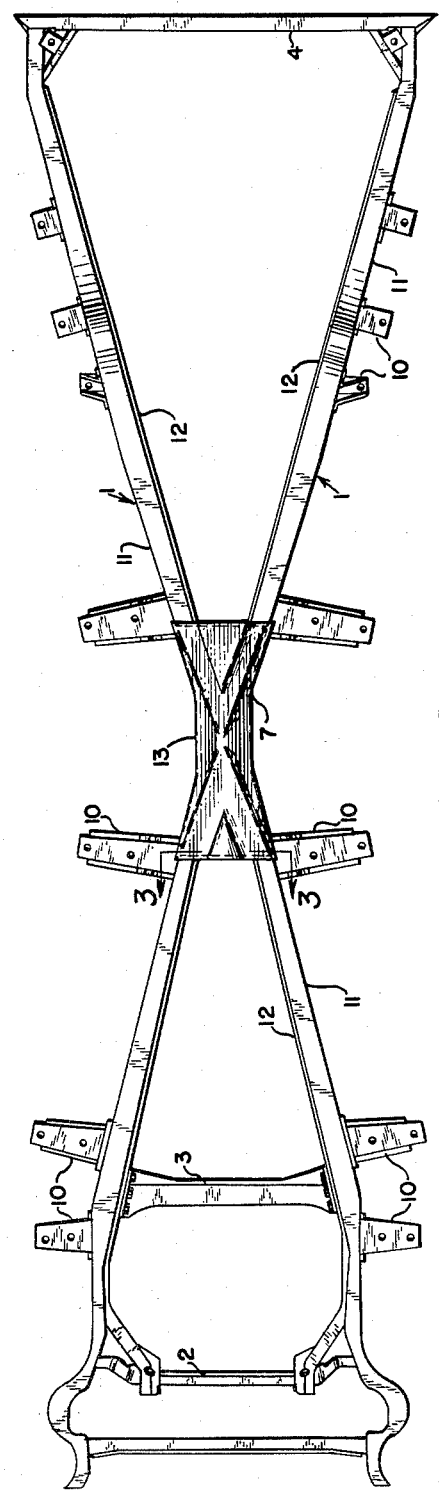
Figure 1 is a top plan view of the vehicle frame of the invention.

Each outer side rail member 11 extends continuously from one end of the frame to the other while the inner side rail members terminate at the ends of the tunnel 9. As shown in Figure 1, a portion of the web of each outer member 11 located at the area of the tunnel 9 is substantially straight, as indicated by 13.

The top plate 7 is provided with a longitudinally extending hump 14 to accommodate the drive shaft which extends through the tunnel. The side edge portions of plate 7 are secured as by welding to the top flange of the outer members 11 and the side edges of the plate are bent downwardly to partially overlap the web of the outer side rail members.

The lower flanges of the outer members 11 are offset upwardly to receive the bottom plate 8 which is welded to the flanges. The outer members 11, top plate 7 and bottom plate 8 form a box section defining the tunnel 9.

In the present construction the upper flange of the outer side rail member 11 is disposed in a generally horizontal plane and at right angles to the web of outer member 11 throughout the length of the side rail. As the upper flange of outer member 11 is flat throughout its length and not deformed in the area of tunnel 9, a continuity of extreme fiber material is provided which, in effect, extends diagonally from one leg of a side rail through the tunnel area to the opposite leg of the other side rail, as for example from the rear leg of the left side rail through the tunnel to the front leg of the right side rail. This continuity of extreme fiber material increases the rigidity of the frame when subjected to forces applied to diagonally opposite locations on the frame. This is best seen in Figure 1, in which the portions of the top plate 7 overlying the upper flanges of the outer members 11 are disposed flatwise with respect to the respective flanges. These flat portions of the top plate are carried in toward the longitudinal center of the tunnel and merge into the hump 14 adjacent the center.

Figure 3:
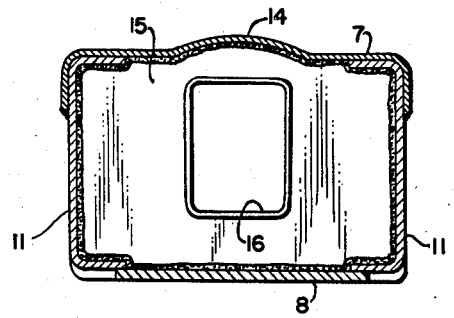
Fig. 3 is a transverse section taken along line 3—3 of Figure 1.

To increase the rigidity of the tunnel area, a bulkhead 15 is welded within each end of the tunnel 9. As best shown in Fig. 3, the bulkhead is welded edgewise at its side edges to the webs of the outer side rail members and at its top and bottom edges of the top plate 7 and bottom plate 8, respecively. While the bulkhead is shown as being welded to all four members defining tunnel 9, the bulkhead can be welded to three of the four members and still maintain the rigidity of the box section. The inner or free ends of the inner side rail members 12 are welded to the outer surface the bulkheads 15.

To accommodate the drive shaft, each bulkhead is formed with a central flanged opening 16.

The bulkhead connects the opposite sides of the box section at the tunnel area and prevents the box section from parallelogramming in service and thereby maintains the rigidity inherent in the box section.

Figure 4:
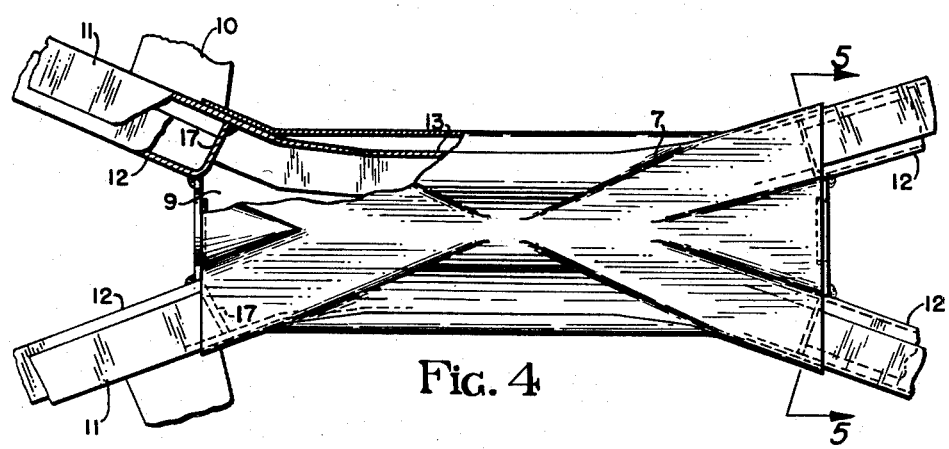
Fig. 4 is an enlarged fragmentary top plan view of a modified form of the invention with parts broken away and sectioned.
Figure 5:
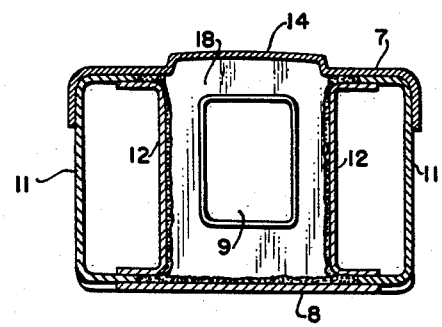
Fig. 5 is a transverse section taken along line 5—5 of Fig. 4.
Figure 6:
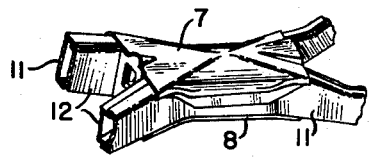
Fig. 6 is a fragmentary perspective view of the central section of the frame.

Figs. 4 and 5 show a modified form of the invention. In this embodiment the inner side rail members 12, instead of terminating at the end of the tunnel, as in the first embodiment, are bent laterally toward the corresponding outer side rail members 11, as indicated by 17, and are welded to the web of the outer side rail members.

In this construction, a bulkhead 18 is disposed at the ends of the tunnel 9 and is welded to the top plate 7, bottom plate 8, and to the webs of the inner side rail members 12. The bulkhead 18 is provided with a central opening 19, similar to that of opening 16 in the bulkhead 15.

In effect, the bulkhead 18 and bent end portions 17 function as a single bulkhead extending laterally between the webs of the outer side rail members 11 and increase the rigidity of the box section defining the tunnel 9 in a manner similar to that of bulkhead 15.

While the above description has described the side rails as having a box-shaped cross section, it is contemplated that the side rails may have any desired cross-sectional shape. Similarly, while the outer and inner side rail members were described as extending continuously from the tunnel to the end of the frame, it is possible that these members may terminate inwardly of the ends of the frame depending on the particular frame construction.

With the present construction, the wheel base of the frame can be conveniently varied with a minimum die cost. An increase in wheel base is generally reflected in an increase in the rear seat floor area and in the present structure the tunnel 9 is located in the rear seat floor area. Therefore, by extending the length of the tunnel, the wheel base can be increased without changing the contour of the remaining portions of the side rails or cross members. For example, the increased wheel base frame can be fabricated by merely using an insert in the die employed to form the side rail outer member in order to increase the length of the straight portion 13 of the member located at the tunnel area. In this case, the top and bottom plates 7 and 8 would necessarily be longer to accommodate the increased tunnel length, but the side rail inner members 12, cross bars and bulkheads would be identical for both the shorter and longer wheel base frames.

As the flanges of outer side rail members 11 are disposed at right angles to the webs of the members throughout the length of the frame, a continuity of extreme fiber material is provided which increases the rigidity of the frame to force applied at diagonally opposite locations.

To reduce the amount of scrap, the hourglass-shaped top plate 7 may be formed in two transverse halves which are welded together along a transverse seam to form the completed top plate.

Various modes of carrying out the invention are contemplated as being within the scope of the following claims particularly pointing out and distinctly claiming the subject matter which is regarded as the invention.

I claim:

1. A cruciform type vehicle frame comprising box-section frame members converging together and having plate members secured therebetween to provide a frame center section, the innermost side walls of said frame members being formed out of their normal plane and against the outermost side walls thereof to provide access for a vehicle drive shaft through said frame center section.

2. A cruciform type vehicle frame comprising channel members secured together to provide box-section frame members, said frame members converging together and having plate members secured across the tops and bottoms thereof for forming a frame center section, the innermost of said channel members of said frame members terminating near the ends of said center section and being formed against the outermost of said channel members to provide an unobstructed access between the outermost of said channel members for receiving a vehicle drive shaft therethrough.

3. A vehicle frame comprising channel members secured together to provide box-section frame rails, a forwardly and a rearwardly extending pair of said frame rails converging together to form a frame center section, plate members secured to the tops and bottoms of each of the outermost channel members of said frame rails at said center section, and the innermost channel members of said rails terminating within the ends of said center section and being formed over to engage the outer wall thereof for providing an unobstructed access through said center section for receiving a vehicle drive shaft therein.

4. A vehicle frame comprising forwardly and rearwardly extending pairs of closed sectioned frame rails converging together to provide a cruciform frame and a center section through which a drive shaft can be extended, said center section including plate members secured to the top and bottom walls of said frame rails and having the innermost walls of said frame rails formed against the outermost walls thereof to provide an open ended unobstructed tubular passageway for said drive shaft therethrough.

5. The vehicle frame of claim 4 wherein the outermost walls of said frame rails on each side of said frame are engaged together within said center section and the innermost walls thereof are terminated short of engagement with any other innermost frame rail wall and are formed to engage their respective outermost frame rail wall to provide a passageway formed by said outermost frame rail walls and said top and bottom plate members.

6. In a backbone-type vehicle frame, a pair of side rail members disposed along the sides of the frame with the central longitudinal portion of each member converging inwardly toward the other member to provide a central section disposed in close proximity to the corresponding central section of the other member, said side rail members having a generally channel-shaped cross section with the upper flanges of the central section of said members extending substantially continuously in a generally horizontal plane, a bottom plate secured to the lower portions of the central sections of said members, and a top plate secured to the upper portions of the central sections of said members and defining a central tunnel in combination with the bottom plate and said members, the portions of the top plate located between the upper flanges of said members defining an upwardly extending hump and the portions of the top plate overlying said upper flanges of said members being disposed flatwise to said flanges to extend the continuity of extreme fiber material inwardly toward the center of the tunnel and the last named portions associated with one of said side rail members joining the corresponding last named portions of the other side rail member in a common plane.

References Cited in the file of this patent

UNITED STATES PATENTS

| | | |
|---|---|---|
| 2,090,990 | Wheat | Aug. 24, 1937 |
| 2,105,144 | Grinham | Jan. 11, 1938 |
| 2,113,540 | Maddock | Apr. 5, 1938 |
| 2,315,643 | Mueller | Apr. 6, 1943 |
| 2,609,217 | Hess | Sept. 2, 1952 |
| 2,747,887 | Schilberg | May 29, 1956 |